United States Patent [19]
Walker

[11] 4,043,706
[45] Aug. 23, 1977

[54] BEARING SUPPORT STRUCTURE FOR ELECTRO-MAGNET DRIVEN PUMP

[76] Inventor: Alan John Walker, 3 Argyle Street, Dornoch, Sutherland, Scotland

[21] Appl. No.: 681,811

[22] Filed: Apr. 30, 1976

Related U.S. Application Data

[63] Continuation of Ser. No. 476,293, June 4, 1974, abandoned.

[30] Foreign Application Priority Data

June 5, 1973 United Kingdom ............... 26630/73

[51] Int. Cl.² .................. F04B 17/00; F04B 35/04
[52] U.S. Cl. ................................. 417/353; 417/420; 415/106; 310/104
[58] Field of Search ............. 417/420, 410, 353, 424; 308/10; 415/106, 104, 131; 310/104, 157, 91

[56] References Cited

U.S. PATENT DOCUMENTS

| | | | |
|---|---|---|---|
| 3,088,416 | 5/1963 | Danis | 415/131 |
| 3,107,310 | 10/1963 | Carriere et al. | 308/10 |
| 3,354,833 | 11/1967 | Laing | 310/104 |
| 3,771,910 | 11/1973 | Laing | 417/420 |
| 3,819,293 | 6/1974 | Zitzmann | 417/420 |
| 3,932,068 | 1/1976 | Zimmermann | 310/104 |

*Primary Examiner*—Carlton R. Croyle
*Assistant Examiner*—Thomas I. Ross
*Attorney, Agent, or Firm*—Pennie & Edmonds

[57] ABSTRACT

An electromagnetically driven pump having a rotor unit comprising a motor armature integral with a pump impeller and supporting bearing means mounting the rotor unit for rotation and limiting axial movement of the rotor unit in one axial direction and additional means for limiting movement of the rotor unit in an opposite axial direction.

3 Claims, 4 Drawing Figures

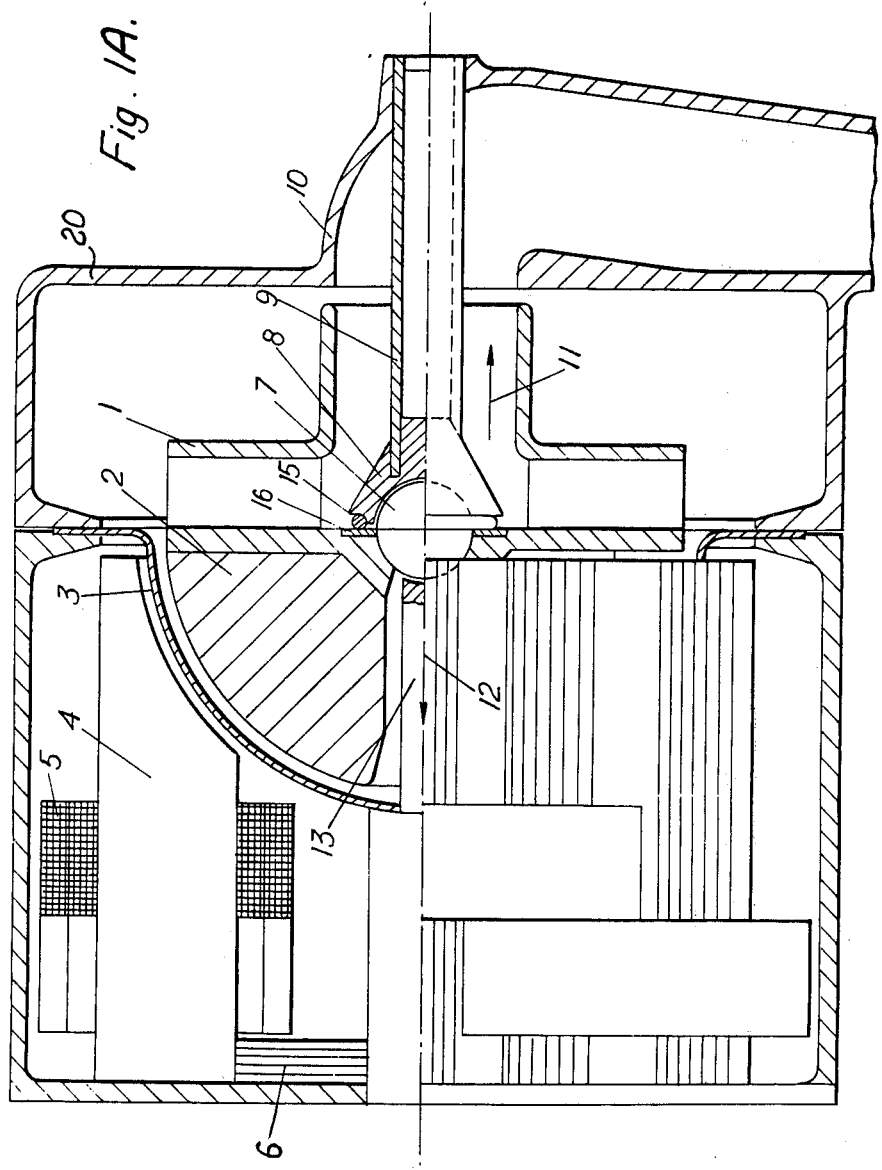

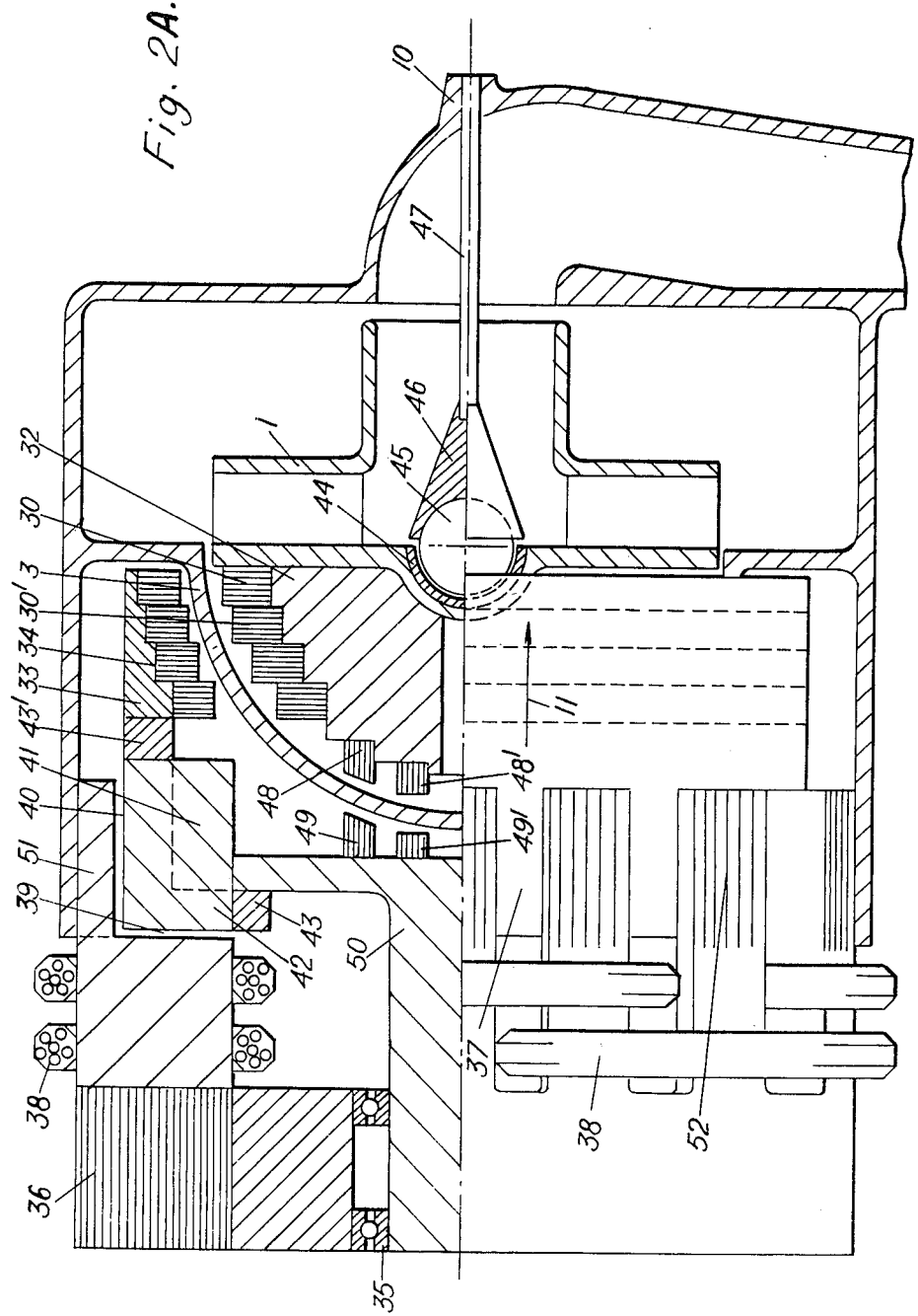

BEARING SUPPORT STRUCTURE FOR ELECTRO-MAGNET DRIVEN PUMP

GENERAL DESCRIPTION OF THE INVENTION

This is a continuation, of application Ser. No. 476,293, filed June 4, 1974, now abandoned.

The invention relates to electromagnetically driven pumps and more particularly to the known class of pump in which a pump impeller and a magnetic rotor are integrated as a unit (the magnetic part of the rotor being of generally spherical profile) which unit is borne by a spherical bearing to rotate in its casing, see for example U.K.Specification No. 1207621. Such pumps are particularly useful when it is required that the rotor unit be completely sealed without rotary glands or the like, where the pumps are used for example for pumping chemically active, sludgy, polluted, noxius, or highly flammable liquids; or for pumping fluids which are under high pressure or vacuum; for pumping liquids with abrasive suspence. In some known designs the rotor unit of such pumps has been driven by a rotating magnetic system constituting part of a magnetic coupling, and in other designs the magnetic rotor has comprises an armature of a motor having a fixed stator. The present invention is applicable to either class of machine. Moreover, although the invention is primarily applicable to a pump of the centrifugal kind, it may apply to an axial, or combined axial-centrifugal, or a radial-flow type pump analagous to a Lungstrom turbine.

In previous designs the spherical bearing has been supported in the casing by means of a cantilever arm or strut anchored in the casing to that side of the rotor unit which is opposite to the intake side, i.e. the side through which the fluid is admitted. It has been recognized that in some applications it is advantageous to anchor the bearing to the casing on the intake side, and have it exposed to the pumped fluid. In the case particularly of centrifugal machines, the intake through the casing is substantially coaxial with the rotor (when running normally) and in such case the bearing arm is, preferably, arranged coaxially with the casing intake and extends similarly coaxially, through the eye of the impeller. The spherical bearing which the arm supports is then located approximately in the plane of rotation between the impeller itself and the magnetic rotor.

It is therefore an object of the invention to provide for a bearing structure for a pump having a coaxial inlet which will support an armature-impeller unit for rotation and to provide means to limit axial movement of the unit in two directions.

An an electromagnetically driven pump is constructed according to the invention generally a pump casing having a central axis first and second walls constituting opposite ends of the casing where the second wall comprise an area of revolution about the central axis and is made of substantially non-magnetic material. A fluid inlet is situated in the first wall and is co-axial with the central axis, and a fluid outlet in the casing.

A bearing structure is provided which is rigid with the first wall and extends within the casing towards the second wall and terminates in a spherical bearing the centre of which coincides with the central axis. A rotor unit comprising a motor armature is integrated with a pump impeller, and is mounted for free and co-axial rotation within the casing by the spherical bearing which is so arranged that fluid forces acting upon the rotor unit in the direction of the firstwall are resisted by the spherical bearing.

A magnetic system, external to the casing and adjacent said second wall, is provided for producing a magnetic field rotating about the said central axis, whereby the rotor unit is influenced to rotate by the magnetic field which penetrates the second wall to cooperate with the motor armature.

A further feature of the invention is that the spherical bearing in such a machine has its stationary part (e.g. the ball or ball-support) and its supporting structure so arranged that, by virtue of elasticity afforded by the construction of the structure, the bearing is restrainedly free to move radially; this accommodates temporary or even permanent out-of-balance of the rotor unit; and may be especially useful if the liquid pumped may carry solids which could at least temporarily obstruct discharge from the impeller and itself constitute an unbalanced mass.

More generally, the invention comprises a pump having an impeller and magnetic rotor integrated as a unit and running in a sealed casing. A complementary magnetic system is included external of the casing to drive the rotor. A spherical-type bearing mounts the impeller-rotor unit for rotation with the bearing being supported by the casing on a stationary structure or arm which extends axially from the casing substantially coaxially into the unit from the side of the rotor opposite to that at which the external magnetic system is located.

Further, the stationary structure may extend through the fluid inlet to the casing and through the intake eye of the impeller which is of centrifugal type. Such a structure may be elastic; for example it may be a tripod structure, attached rigidly at its inner end to the stationary bearing part (e.g. the ball) and at its outer end to the casing intake, the structure being of openwork nature forming practically no obstruction to flow into the casing; and near the bearing there may be a fairing to direct the fluid with a radial vector through the impeller eye.

In operation, the magnetic rotor may be attached axially towards the magnetic system, thus moving away from the spherical bearing. Such magnetic attraction would, in normal use, be adequately countered by the hydraulic forces acting on the rotor and urging it towards the inlet and the spherical bearing. However, should the magnetic force become predominant, further bearing means may be provided which engage with the rotor should it lift off its spherical bearing.

Such further bearing means may, for example comprise a fixed finger-like member anchored in the concave wall of the casing and extending therefrom axially into the rotor unit, with radial clearance, to the locality of the bearing so as to form a stop in an axial sense of rotor movement.

The invention further includes electromagnetic drive arrangements which are particularly adapted to be advantageous with the features above mentioned. These are described in detail in the following descriptions of machines embodying the invention which are illustrated by the accompanying drawings which are:

FIG. 1A is a side sectional view constructed according to the invention in which the magnetic rotor unit is supported in operation by a spherical body, e.g. a ball, which is mounted in the suction inlet of the pump casing;

FIG. 1B is a partial sectional view of the pump of FIG. 1A illustrating the full side view of the stator and bearing support;

FIG. 2A is a side sectional view of a further an embodiment in which the magnetic rotor is driven by a rotating magnet, FIG. 2B is a partial sectional view of the machine of FIG. 2A illustrating the full side view of the rotating magnetic and bearing support;

FIG. 1 shows a pump-motor-set, in which a magnetic rotor comprises an impeller 1 which forms a single unit in conjunction with an armature 2. The surface of the armature facing a magnetically permeable, separating wall 3, is spherical. A stator is arranged behind the wall 3, which stator consists of pole pieces 4, coils 5 and a pole bridging piece 6. A ball 7 is firmly attached to the magnetic rotor. The ball 7 is carried in a concave bearing cup 8 which together form a bearing structure rotatably supporting the rotor-impeller unit. This cup 8 is firmly attached by a tube or pillar 9 to the pump casing 10. The casing is formed in part by first axial end wall 20 and the separation wall 3 which forms a second axial end wall. In operation, the impeller 1 generates a hydraulic force in the direction of arrow 11. This hydraulic pressure produced on the delivery side of the impeller 1 extends into the space between the curved wall 3 and the outer periphery of the rotor 2 and into the central region of the armature adjacent to the ball 7 such that substantially the complete cross-sectional area of the armature 3 and ball 7 are subject to the higher pressure. During the starting period, the armature 2 is urged by magnetic forces in the direction of the arrow 12. Axial movement of the rotor in this latter direction is resisted by the pin 13 which acts as a further bearing means. As soon as the hydraulic forces are larger than the magnetic forces, the ball 7 shifts away from the pin or pillar 13 and into the concave bearing cup 8.

FIG. 2 shows a modified embodiment in which the rotor comprises an impeller 1 which forms a single unit with an armature 32 of magnetic material. A spherical surface is approximated by a series of permanent magnet rings such as 30 and 30' with diameters diminishing in steps, which rings 30, 30' co-operate with further magnetic rings, such as 34, situated externally thereto in spaced relationship separated therefrom by a wall 3 of non-magnetic material. The external rings 34 are carried by an armature 50, mounted for rotation on bearings 35. Armature 50, also bears a ring 41 of soft iron, slotted to carry therein conductor rods 42, the respective ends of which are electrically joined by copper rings 43 and 43', thus constituting the armature of an induction motor. A stator, comprising pole pieces 51, windings 38, and a pole bridging ring 36, co-operates with armature 50 and causes it to rotate when coils 38 are suitably energised, thus rotating magnetic rings 34 and causing rings 30, 30' and the magnetic rotor 1, 32 to also rotate due to the magnetic coupling between rings 34 and rings 30, 30'.

Armature 32 and impeller 1 have a central and sperical bearing cup 44 which mates with a ball 45 which is in turn supported by a further and fixed bearing cup 46 mounted on a pillar 47 extending axially from pump casing 10.

In order to prevent the impeller 1 and armature 32 from moving to the left (as viewed in FIG. 2), opposing magnets 48, 49, and 48', 49', are provided which urge the rotor assembly in the direction of arrow 11 and where the magnets can be considered as a further bearing means.

It will be noted that motor armature 50 is separated from its co-operating stator by radial and axial air gaps 40 and 39 respectively. Pole pieces 51 are provided with slots 52 in order to reduce edddy current losses. These two features, i.e. gaps 39, 40 and slotted pole pieces 51, are not confined to pump applications and may find use in electric motors in general, and as such are within the scope of the invention.

The pillar 47 preferably has sufficient resilience to compensate for small out-of-balance forces of the rotor 1, 32, that may occur in operation.

I claim:

1. An electromagnetically driven pump comprising: a pump casing having first and second axially spaced end walls where said second wall comprises a substantially magnetically permeable material;
   a fluid inlet coaxially positioned within said first wall;
   a fluid outlet in said casing;
   a rotor unit comprising a motor armature integral with a pump impeller;
   a magnetic system exterior of said casing adjacent said second wall for providing a rotating magnetic force to rotate said rotor unit;
   a bearing structure coaxially mounted with respect to said first wall and extending within said casing towards said second wall with the bearing structure comprising a first spherical bearing surface mounted on said rotor unit and a first pillar having a second bearing surface complimentary to said first spherical bearing surface coaxially mounted to said first wall to rotatably support said rotor unit against axial movement towards said first wall under the influence of liquid pressure when said pump is operating; and,
   a further bearing means associated with said second wall for rotatably supporting said rotor unit and for opposing movement of said unit towards said magnetic system due to the force of magnetic attraction between the magnetic system and said rotor unit with the further bearing means comprising a second pillar having a third spherical bearing surface complimentary to said first spherical surface coaxially mounted with respect to said second wall whereby said second and third complimentary bearing surfaces are engageable with said first spherical surface to rotatably support said rotor unit and resist axial movement of said unit towards said first and second walls.

2. An electromagnetically driven pump according to claim 1 wherein said bearing structure is resiliently mounted with respect to said first wall to allow limited transverse movement of said rotor unit with respect to said casing.

3. An electromagnetically driven pump comprising:
   a pump casing having first and second axially spaced end walls where said second wall comprises a substantially magnetically permeable material;
   a fluid inlet coaxially positioned within said first wall;
   a fluid outlet in said casing;
   a rotor unit in said casing comprising a motor armature integral with a pump impeller and where said unit has a portion opposite said first wall and a portion opposite said second wall with substantially all of the portion opposite said second wall being under the influence of liquid pressure in the fluid outlet when said pump is operating;

a magnetic system exterior of said casing adjacent said second wall for providing a rotating magnetic force to rotate said rotor unit; and a bearing structure coaxially mounted with respect to said first wall and extending within said casing towards said second wall with the bearing structure comprising a first spherical bearing surface mounted on said rotor unit and a pillar having a second bearing surface complimentary to said first spherical bearing surface coaxially mounted to said first wall to rotatably support said rotor unit against axial movement towards said first wall under the influence of liquid pressure in the fluid outlet when said pump is operating.

* * * * *

UNITED STATES PATENT AND TRADEMARK OFFICE
CERTIFICATE OF CORRECTION

PATENT NO. : 4,043,706

DATED : August 23, 1977

INVENTOR(S) : Alan John Walker

It is certified that error appears in the above-identified patent and that said Letters Patent are hereby corrected as shown below:

```
Col. 1, line 24 change "has comprises" to --comprises
Col. 1, line 53, change "An an" to --An--
Col. 1, line 54, change "generally" to --generally comprises--
Col. 1, line 57, change "comprise an" to --comprises an--
Col. 3, line 4, change "an embodiment" to --embodiment--
Col. 4, line 4, change "edddy" to --eddy--
Claim 1, line 1, change "comprising: a" to --comprising:
                                              a--
```

Signed and Sealed this

Twenty-ninth Day of November 1977

[SEAL]

Attest:

RUTH C. MASON
Attesting Officer

LUTRELLE F. PARKER
Acting Commissioner of Patents and Trademarks